US010284619B2

(12) United States Patent
Li et al.

(10) Patent No.: US 10,284,619 B2
(45) Date of Patent: May 7, 2019

(54) METHOD FOR SCALABLE DISTRIBUTED NETWORK TRAFFIC ANALYTICS IN TELCO

(71) Applicant: Telefonaktiebolaget L M Ericsson (publ), Stockholm (SE)

(72) Inventors: Du Li, Palo Alto, CA (US); Ying Zhang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 452 days.

(21) Appl. No.: 14/175,122

(22) Filed: Feb. 7, 2014

(65) Prior Publication Data
US 2015/0207706 A1 Jul. 23, 2015

Related U.S. Application Data

(60) Provisional application No. 61/930,295, filed on Jan. 22, 2014.

(51) Int. Cl.
*G06F 15/173* (2006.01)
*H04L 29/08* (2006.01)
(Continued)

(52) U.S. Cl.
CPC .............. *H04L 67/02* (2013.01); *G06F 17/30* (2013.01); *H04L 43/026* (2013.01); *H04L 43/04* (2013.01);
(Continued)

(58) Field of Classification Search
CPC ... H04L 43/026; H04L 43/04; H04L 63/1408; H04L 63/1425; H04L 12/2602; H04L 41/16; H04L 43/00; H04L 47/41
See application file for complete search history.

(56) References Cited

U.S. PATENT DOCUMENTS 7,318,102 B1 * 1/2008 Krause ................. H04L 1/1635
709/227
2004/0015599 A1 * 1/2004 Trinh ..................... G06F 9/3885
709/232
(Continued)

OTHER PUBLICATIONS

B. Trammell et al., "Flow Aggregation for the IP Flow Information Export (IPFIX) Protocal," Sep. 2013, 49 pages, Request for Comments: 7015, IETF Trush and the persons identified as the document authors.*

(Continued)

*Primary Examiner* — Umar Cheema
*Assistant Examiner* — Anh Nguyen
(74) *Attorney, Agent, or Firm* — Patent Portfolio Builders, PLLC

(57) ABSTRACT

Exemplary methods for performing distributed data aggregation include receiving Internet Protocol (IP) traffic from only a first portion of the network. The methods further include utilizing a big data tool to generate a summary of the IP traffic from the first portion of the network, wherein a summary of IP traffic from a second portion of the network is generated by a second network device utilizing its local big data tool. The methods include sending the summary of the IP traffic of the first portion of the network to the third network device, causing the third network device to utilize its local big data tool to generate a summary of the IP traffic of the first and second portion of the network based on the summaries received from the first and second network devices, thereby allowing the IP traffic in the network to be characterized in a distributed manner.

22 Claims, 17 Drawing Sheets

(51) Int. Cl.
  H04L 12/26 (2006.01)
  H04L 29/06 (2006.01)
  G06F 17/30 (2006.01)
(52) U.S. Cl.
  CPC ...... *H04L 63/1416* (2013.01); *H04L 63/1458* (2013.01); *Y02D 50/30* (2018.01)

(56) References Cited

U.S. PATENT DOCUMENTS

| 2008/0279111 | A1* | 11/2008 | Atkins | H04L 43/026 370/252 |
| 2013/0070622 | A1* | 3/2013 | Degioanni | H04L 67/1097 370/252 |
| 2015/0092550 | A1* | 4/2015 | Christian | H04L 47/31 370/235 |

OTHER PUBLICATIONS

A Proposal of Large-scale Traffic Monitoring System using Flow Concentrators Atsushi Kobayashi, Daisuke Matsubara, Shingo Kimura, Motoyuki Saitou, Yutaka Hiroka W A, Hitoaki Sakamoto, Keisuke Ishibashi and Kimihiro Yamamoto.*

An optimal distributed trigger counting algorithm for large-scale networked systems. Seokhyun Kim, Jaeheung Lee, Yongsu Park2 and Yookun Cho. Simulation published on line May 17, 2013. (See attachment).*

Yeonhee Lee et al., "Toward Scalable Internet Traffic Measurement and Analysis with Hadoop," Jan. 2013, 8 pages, ACM SIGCOMM Computer Communication Review, vol. 43, No. 1.

Atsushi Kobayashi et al., "A Proposal of Large-Scale Traffic Monitoring System Using Flow Concentrators," 2006, pp. 53-62, APNOMS 2006, LNCS 4238.

B. Trammell et al., "Flow Aggregation for the IP Flow Information Export (IPFIX) Protocol," Sep. 2013, 49 pages, Request for Comments: 7015, IETF Trust and the persons identified as the document authors.

"Apache Hadoop", retrieved from http://en.wikipedia.org/wiki/Apache_Hadoop on Feb. 4, 2014, 15 pages.

Bar-Yossef, et al., "Counting distinct elements in a data stream", *Proceedings of the 6th International Workshop on Randomization and Approximation Techniques, Random*, (2002), 10 pages.

Chakaravarthy, et al., "An Efficient Decentralized Algorithm for the Distributed Trigger Counting Problem", *Proceedings of the 12th International Conference on Distributed Computing and Networking, ICDCN 2011*, (2011), pp. 53-64.

Cormode, et al., "Finding hierarchical heavy hitters in streaming data", *ACM Transactions on Knowledge Discovery from Data (TKDD)*, vol. 1, Issue 4, (Jan. 2008), 43 pages.

Cranor, et al., "Gigascope: A Stream Database for Network Applications", *SIGMOD 2003*, (Jun. 9-12, 2003), pp. 647-651.

Duffield, et al., "Estimating Flow Distributions from Sampled Flow Statistics", *SIGCOMM '03*, (Aug. 25-29, 2003), 12 pages.

Huang, L., et al.,"Communication-Efficient Tracking of Distributed Cumulative Triggers", *IEEE*, 2007, (Jun. 2007), 10 pages.

Huang, et al., "In-Network PCA and Anomaly Detection", *Advances in Neural Information Processing Systems (NIPS)*, (Dec. 2006), 8 pages.

Huang, et al., "Toward Sophisticated Detection With Distributed Triggers", *SIGCOMM 2006 Workshop on Mining Network Data (MineNet-06)*, (Sep. 11-15, 2006), 6 pages.

Kim, et al., "An optimal distributed trigger counting algorithm for large-scale networked systems", *Simulation*, (May 17, 2013), 15 pages.

Kshemkalyani, "Fast and Message-Efficient Global Snapshot Algorithms for Large-Scale Distributed Systems", *IEEE Transactions on Parallel and Distributed Systems*, vol. 21, No. 9, (Sep. 2010), pp. 1281-1289.

Schweller, et al., "Reversible Sketches for Efficient and Accurate Change Detection over Network Data Streams", *Proceedings of the 4th ACM SIGCOMM Conference on Internet Measurement, IMC '04*, conferences.sigcomm.org/imc/2004/papers/p207-schweller.pdf, (Oct. 25-27, 2004), pp. 207-212.

Yu, et al., "Software Defined Traffic Measurement with OpenSketch", *10th USENIX Symposium on Networked Systems Design and Implementation (NSDI '13)*, https://www.usenix.org/system/files/.../nsdi13-final116.pdf, (2013), 14 pages.

Yuan, et al., "ProgME: Towards Programmable Network MEasurement", *SIGCOMM'07, ACM*, (Aug. 27-31, 2007), 12 pages.

Zaharia, et al., "Resilient Distributed Datasets: A Fault-Tolerant Abstraction for In-Memory Cluster Computing", *NDSI*, http://www.cs.berkeley.edu/~matei/papers/2012/nsdi_spark.pdf, (Apr. 2012), 14 pages.

Kobayashi A. et al. IP Flow Information Export (IPFIX) Mediation: Framework, XP015075950, Apr. 5, 2011, pp. 1-29.

Sadasivan G. et al. "Architecture for IP Flow Information Export," Network Working Group, XP015065536, Mar. 31, 2009, pp. 1-31.

Office Action in application No. 15708882.4 dated Jun. 6, 2018.

* cited by examiner

```
//input dataset ipTuples
val dstCounts = ipTuples.map{case(IPPacket(time,proto,len,src,srcport,dst,dstport))
                            => (dst, src)}  ~605
                .groupByKey()  ~610
                .map{case(dst,seq) => (dst, seq.distinct.count)}  ~615

//output top-k destination addresses
dstCounts.sortByKey.take(k)  ~620
```

FIG. 6A
(Centralized count traffic / DDoS detection)

Algorithm of low-level DPU i <- (1..N)

```
//input dataset ipTuples_i
val dstCounts_i = ipTuples_i.map{case(IPPacket(time,proto,len,src,srcport,dst,dstport))
                    => (dst, src)}
                  .groupByKey()
                  .map{case(dst,seq) => (dst, seq.distinct.count)}
//send output dataset dstCounts_i to high-level DPU
```
— 602

Algorithm of high-level DPU

```
//receive input dataset dstCounts_1, ..., dstCounts_N
val input = union(dstCounts_1, ..., dstCounts_N)                    — 625
val dstCounts = input.reduceByKey(_ + _)                            — 630
//output top-k destination addresses
dstCounts.sortByKey.take(k)                                         — 635
```
— 603

FIG. 6B
(Distributed count traffic / DDoS detection)

```
//input dataset ipTuples
val flowBytes = ipTuples.map{case(IPPacket(time,proto,len,src,srcport,dst,dstport))
    => (Flow(src,dst,srcport,dstport,proto) -> len)}
    .reduceByKey(_+_)

//classify flowBytes and output
```

FIG. 7A
(Centralized flow size distribution)

Algorithm of low-level DPU

//input dataset ipTuples_i
val flowBytes_i = ipTuples_i.map{case(IPPacket(time,proto,len,src,srcport,dst,dstport))
=> (Flow(src,dst,srcport,dstport,proto) -> len)}
.reduceByKey(_+_)

//send output dataset flowBytes_i to high-level DPU

Algorithm of high-level DPU

//receive input dataset flowBytes_1, ..., flowBytess_N
val input = union(flowBytes_1, ..., flowBytes_N)
val flowBytes = input.reduceByKey(_+_)

//classify flowBytes and output

FIG. 7B
(Distributed flow size distribution)

```
//input dataset ipTuples
val hhh= ipTuples.flatMap{case(IPPacket(time,proto,len,src,srcport,dst,dstport))
        => dissect(src,dst).map(hitter => (hitter -> len))}
    .reduceByKey(_+_)
//beautify hhh and output
```

FIG. 8A
(Centralized hierarchical heavy hitter detection)

Algorithm of low-level DPU

```
//input dataset ipTuples_i <- (1...N)
val hhh_i = ipTuples_i.flatMap{case(IPPacket(time,proto,len,src,srcport,dst,dstport))
                => dissect(src,dst).map(hitter => (hitter -> len))}
            .reduceByKey(_+_)
//send output dataset hhh_i to high-level DPU
```

Algorithm of high-level DPU

```
//receive input dataset hhh_1, ..., hhh_N
val input = union(hhh_1, ..., hhh_N)
val hhh = input.reduceByKey(_+_)
//classify hhh and output
```

FIG. 8B
(Distributed hierarchical heavy hitter detection)

```
//input dataset ipTuples
val srcCounts = ipTuples.map{case(IPPacket(time,proto,len,src,srcport,dst,dstport))
                => (src, dst)}
            .groupByKey()
            .map{case(src,seq) => (src, seq.distinct.count)}
//output top-k source addresses
srcCounts.sortByKey.take(k)
```

FIG. 9A
(Centralized super spreader/WORM detection)

Algorithm of low-level DPU i <- (1...N)

```
//input dataset ipTuples_i
val srcCounts_i = ipTuples_i.map{case(IPPacket(time,proto,len,src,srcport,dst,dstport))
                    => (src,dst)}
                  .groupByKey()
                  .map{case(src,seq) => (src, seq.distinct.count)}
//send output dataset srcCounts_i to high-level DPU
```

Algorithm of high-level DPU

```
//receive input dataset srcCounts_1,..., srcCounts_N
val input = union(srcCounts_1, ..., srcCounts_N)
val srcCounts = input.reduceByKey(_+_)

//output top-k source addresses
srcCounts.sortByKey.take(k)
```

FIG. 9B
(Distributed super spreader/WORM detection)

```
//input dataset ipTuples(k) for time window k
1. compute flow size distribution flowBytes(k)
2. if flowBytes(k-1) not exists:
      record flowBytes(k)
   else //compute delta:
      flowChanges(k-1, k) = flowBytes(k) – flowBytes(k-1)
//output changes by some criteria, e.g., absolute changes
```

FIG. 10A
(Centralized flow change detection)

*Algorithm of low-level DPU i <- (1...N)*

//input dataset ipTuples_i(k) for time window k
1. compute flow size distribution flowBytes_i(k)
2. if flowBytes_i(k-1) not exists:
    record flowBytes_i(k)
   else //compute delta:
    flowChanges_i(k-1, k) = flowBytes_i(k) − flowBytes_i(k-1)
//send output dataset flowChanges_i(k-1,k) to next level DPU

*Algorithm of high-level DPU*

//receive input dataset flowChanges_i(k-1,k) from all lower-level DPU_i
1. val input = union of all flowChanges_i(k-1,k)
2. val flowChanges(k-1,k) = input.reduceByKey(_ + _)
//output changes by some criteria, e.g., absolute changes FIG. 10B
(Distributed flow change detection)

General Patterns in Network Traffic Analytics

Centralized Version

(1) load input dataset, e.g., ipTuples
(2) user-defined map/reduce functions:
    a) extract key-value pairs
    b) for each key, aggregate values
(3) output to user/file

Distributed Version top-level DPU
(1) receive/aggregate all source inputs
(2) input.reduceByKey(_+_)
(3) output to user/file intermediate-level DPU
(1) receive/aggregate all source inputs
(2) input.reduceByKey(_+_)
(3) upload to next level DPU bottom-level DPU_i
(1) load input dataset, e.g., ipTuples_i
(2) user-defined map/reduce functions:
    a) extract key-value pairs
    b) for each key, aggregate values
(3) upload to next level DPU Spec of workload with UDF's Map the workload spec to the network of DPUs depending on resources, #DPUs may range from 1 to N, arbitrary # of intermediate levels possible. Centralized exec if #DPU == 1.

FIG. 11

METHOD FOR SCALABLE DISTRIBUTED NETWORK TRAFFIC ANALYTICS IN TELCO

CROSS-REFERENCE TO RELATED APPLICATIONS

This application claims the benefit of U.S. Provisional Application No. 61/930,295, filed Jan. 22, 2014, which is hereby incorporated by reference.

FIELD

Embodiments of the invention relate to the field of packet networks; and more specifically, to network traffic aggregation using big data tools in a distributed network architecture.

BACKGROUND

In the telco domain, network traffic is generated from a large amount of nodes (e.g., consumer devices, routers, servers, base stations, etc.) continuously at a very high speed. As used herein, the telco domain refers to a networking domain of Internet Service Providers (ISPs). Network traffic analytics is fundamental and critical to understanding the behavior of the network and optimizing the performance of the network and applications. Network traffic analytics also play an important role in identifying attacks to the network and allowing network administrators to take appropriate security measures. To cope with the high volume and high speed of the traffic data, big data technologies could be applied in the telco domain to help develop network traffic analytics. As used herein, big data technologies/analytics refer to technologies for processing/characterizing big data (i.e., data of high volume, speed, and variety). However, current big data technologies originated largely in the Internet domain. As used herein, the Internet domain refers to a networking domain of content providers such as Google, Yahoo, Facebook, Twitter, etc. Such content providers aggregate and process human-generated content in centralized data centers. Due to the fundamental differences between the properties of data in the telco and Internet domains, those technologies would be suboptimal for the telco domain.

Maintaining normal operation of the network is the topmost concern in the telco domain. Running data analytics should not degrade, disrupt, or compromise network operation. Uploading all the traffic data to a few centralized data centers would itself require significant network resources. Aggregating data at this scale would compromise the utilization of the network.

In the telco domain, it is machines rather than human users that automatically and continuously generate data at a very high speed. To add real values, data collection and analytics must at least be able to keep pace with data generation, if not faster. Centralized data processing at this scale would cause long lags, which may render the analytic results irrelevant, e.g., in detection of WORM and DDoS attacks.

SUMMARY

Exemplary methods for aggregating Internet Protocol (IP) traffic using a big data tool in a distributed manner include a first network device in a network communicatively coupled to a second network device, wherein the first and second network devices are communicatively coupled to a third network device. According to one embodiment, the exemplary methods, performed by the first network device, include receiving IP traffic from only a first portion of the network, wherein IP traffic from a second portion of the network is received by the second network device. In one embodiment, the methods include utilizing a big data tool to generate a summary of the IP traffic from the first portion of the network, wherein a summary of IP traffic from a second portion of the network is generated by the second network device utilizing its local big data tool. In at least one embodiment, the methods include sending the summary of the IP traffic of the first portion of the network to the third network device, causing the third network device to utilize its local big data tool to generate a summary of the IP traffic of the first and second portion of the network based on the summary from the first network device and the summary from the second network device, thereby allowing the IP traffic in the network to be characterized in a distributed manner between the first, second, and third network device.

In one embodiment, generating the summary of the IP traffic from the first portion of the network includes, for each IP data of the IP traffic, accessing a set of fields from the received IP data. Generation of the summary further includes determining a key field based on one or more fields from the set of fields and determining a value field based on one or more fields from the set of fields.

In one aspect of the invention, generating the summary of the IP traffic from the first portion of the network further includes partitioning the set of IP data into groups based on the key fields, such that each group includes a unique key and one or more values from one or more IP data having the same key field.

In at least one embodiment, generating the summary of the IP traffic from the first portion of the network further includes for each group, aggregating multiple values to generate an aggregate value, wherein the aggregate value indicates a number of unique values indicated by the value fields for the corresponding key field.

Exemplary methods for aggregating Internet Protocol (IP) traffic using a big data tool in a distributed manner include a first network device in a network communicatively coupled to a second network device and a third network device. According to one embodiment, the exemplary methods, performed by the first network device, include receiving a summary of Internet Protocol (IP) traffic of a first portion of the network from the second network device, wherein the summary of IP traffic of the first portion of the network is generated by the second network device using its local big data tool.

In one embodiment, the methods include receiving a summary of IP traffic of a second portion of the network from the third network device, wherein the summary of IP traffic of the second portion of the network is generated by the third network device using its local big data tool. In one aspect of the invention, the methods further include utilizing a big data tool to generate a summary of the IP traffic of the first and second portion of the network based on the summary from the second network device, and the summary from the third network device, thereby allowing IP traffic in the network to be characterized in a distributed manner between the first, second, and third network device. In one embodiment, the methods include providing the summary of the IP traffic of the first and second portion of the network to a user, such that the user can determine whether an anomaly exists in the network.

BRIEF DESCRIPTION OF THE DRAWINGS

Embodiments of the invention are illustrated by way of example and not limitation in the figures of the accompanying drawings in which like references indicate similar elements.

FIG. 6A is a diagram illustrating a pseudo code for aggregating data according to one embodiment.

FIG. 6B is a diagram illustrating a pseudo code for aggregating data according to one embodiment.

FIG. 7A is a diagram illustrating a pseudo code for aggregating data according to one embodiment.

FIG. 7B is a diagram illustrating a pseudo code for aggregating data according to one embodiment.

FIG. 8A is a diagram illustrating a pseudo code for aggregating data according to one embodiment.

FIG. 8B is a diagram illustrating a pseudo code for aggregating data according to one embodiment.

FIG. 9A is a diagram illustrating a pseudo code for aggregating data according to one embodiment.

FIG. 9B is a diagram illustrating a pseudo code for aggregating data according to one embodiment.

FIG. 10A is a diagram illustrating a pseudo code for aggregating data according to one embodiment.

FIG. 10B is a diagram illustrating a pseudo code for aggregating data according to one embodiment.

FIG. 11 is a block diagram illustrating the general design patterns for mapping analytic from a centralized to a distributed network of DPUs.

DESCRIPTION OF EMBODIMENTS

Figure 1:
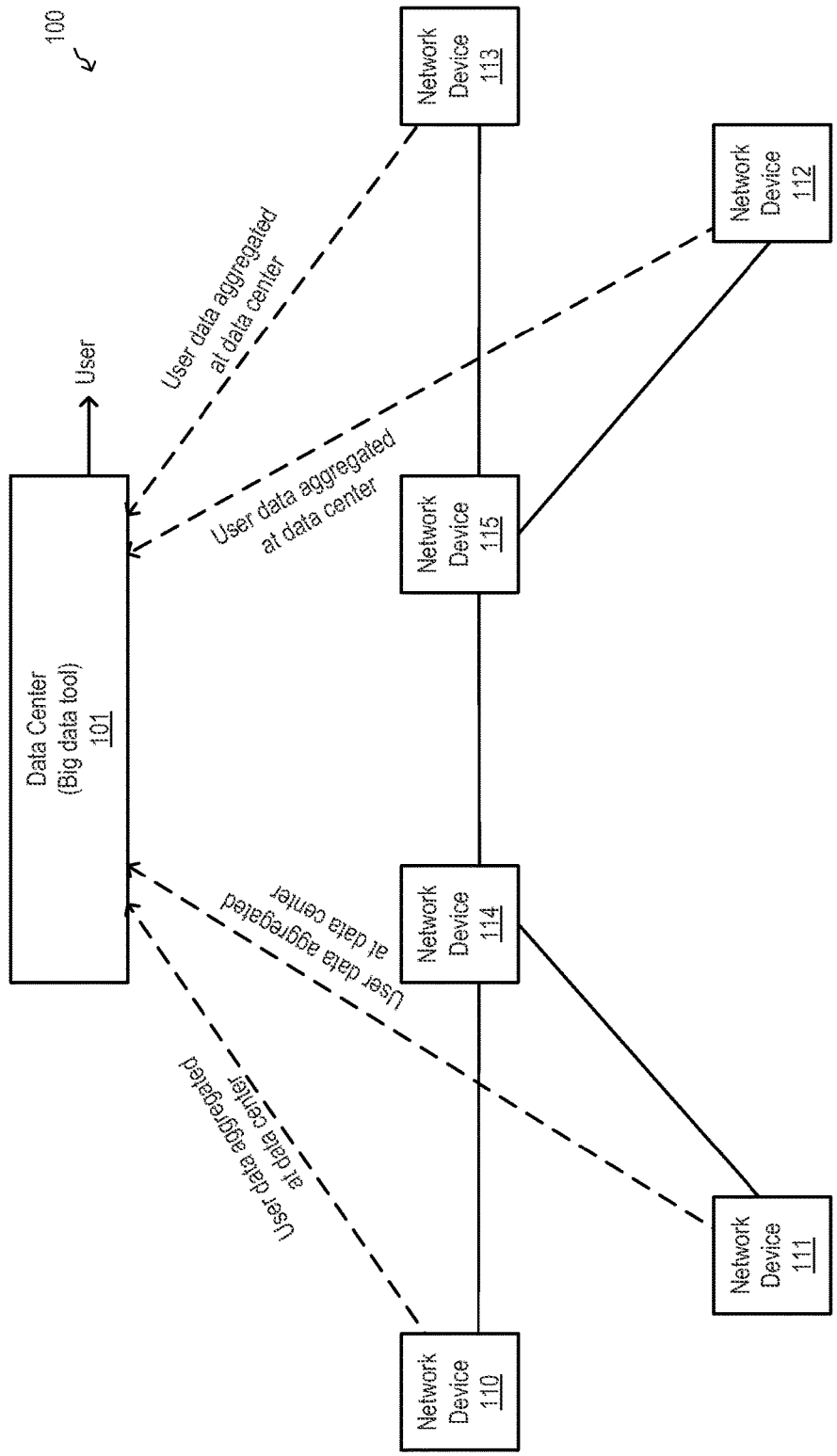
FIG. 1 is a block diagram illustrating a conventional network for aggregating data at a centralized data center.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Different embodiments of the invention may be implemented using different combinations of software, firmware, and/or hardware. Thus, the techniques shown in the figures can be implemented using code and data stored and executed on one or more electronic devices (e.g., an end station, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network device or computing device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Current big data technologies are originated and mostly developed in Internet companies, especially Google, Yahoo, Facebook, LinkedIn, and Twitter. Their main business is to aggregate user-generated content and add value to the content that is proportional to their user base, e.g., by associating ads with user data. Their business model is consistent with their centralized aggregation and processing of data in only a few datacenters. The fast growth of those Internet companies over the past decade bears testimony to the suitability of big data technologies in their domain.

Current big data technologies in general assume data can be aggregated and processed inexpensively and timely in a few datacenters. While this is reasonable with user-generated content, it is suboptimal for purposes of network traffic analytics. On the Internet, one byte of user-generated content may incur hundreds of bytes of network traffic to transmit the content. When all those traffic bytes are uploaded to a datacenter, in turn thousands of new bytes may be generated, ad infinitum. It is simply too expensive with regard to bandwidth utilization and time to aggregate all the network traffic to one or a few datacenters to process all the data.

There are recent approaches to network traffic analytics using distributed triggering mechanisms. For example, "In-Network PCA and Anomaly Detection" (Ling Huang, Xuan-Long Nguyen, Minos Garofalakis, Anthony Joseph, Michael Jordan and Nina Taft. In Advances in Neural Information Processing Systems (NIPS) 19. Vancouver, B.C, December 2006) (hereafter referred to as "Reference 1"), "Toward Sophisticated Detection With Distributed Triggers" (Ling Huang, Minos Garofalakis, Joseph Hellerstein, Anthony D. Joseph and Nina Taft. In SIGCOMM 2006 Workshop on Mining Network Data (MineNet-06)) (hereafter referred to as "Reference 2"), and "Communication-Efficient Tracking of Distributed Cumulative Triggers" (Ling Huang, Minos Garofalakis, Anthony D. Joseph and Nina Taft. In *Proceedings of the International Conference on Distributed Computing Systems (ICDCS'07)*. Toronto, Canada, June 2007) (hereafter referred to as "Reference 3"). Reference 1 proposes a Principle Component Analysis (PCA) based anomaly detector that runs on a set of distributed servers. It describes an adaptive method that periodically sends information to the coordinators for accurate global detection. Reference 2 designs a distributed protocol to detect unusual traffic patterns under the PCA framework. Reference 3 studies the trade-offs between communication overhead and the detection accuracy in the distributed trigger methods.

These references do not utilize big data technologies. Instead, they carefully craft the distributed algorithms or protocols that are executed at selected nodes on the Internet. Thus, these approaches are not scalable to the number of analytics as each one must be individually crafted and deployed. Big data technologies could be adapted to solve network traffic analytics problems systematically in a more principled manner although a verbatim application of current big data technologies may not be as efficient. As will be described, similar programming patterns could be applied across different analytics using (extended) big data technologies. These patterns can be generalized into a new generation of distributed big data platform to automate the development and deployment of a wide range of network traffic analytics.

FIG. 1 is a block diagram illustrating a conventional architecture for aggregating user-generated data. As used herein, aggregation refers to the collection and/or grouping of data based on some predetermined criteria (key), so that data can be characterized in one data center. FIG. 1 illustrates network 100 (e.g., a cellular network) comprising of network devices 110-113, each of which is communicatively to one or more local user endpoints (UEs), such as laptops, mobile devices, etc. (not shown). In FIG. 1, network devices 110-111 are communicatively coupled to network device 114, network devices 112-113 are communicatively coupled to network device 115, and network devices 114 and 115 are communicatively coupled to each other. Conventionally, user generated data are all sent to a centralized data center (e.g., data center 101), where they are all aggregated. Thus, when this setup is applied directly in network traffic analytics, for example, user data generated at UEs communicatively coupled to network device 110 are sent by network device 110 to data center 101, and user data generated at UEs communicatively coupled to network device 111 are sent by network device 111 to data center 101, and so on and so forth. Once aggregation of all the data are completed, data center 101 provides the results to a user.

As described above, aggregation of user generated data at a centralized data center using big data tools may be reasonable. However, to aggregate a massive amount of machine-generated data at a centralized data center is not efficient in terms of cost and bandwidth utilization. The present invention overcomes these limitations by providing mechanisms for using big data technologies in a distributed manner to aggregate network traffic at multiple nodes in the network, such that traffic aggregation can be distributed between the nodes in the network.

Figure 2:
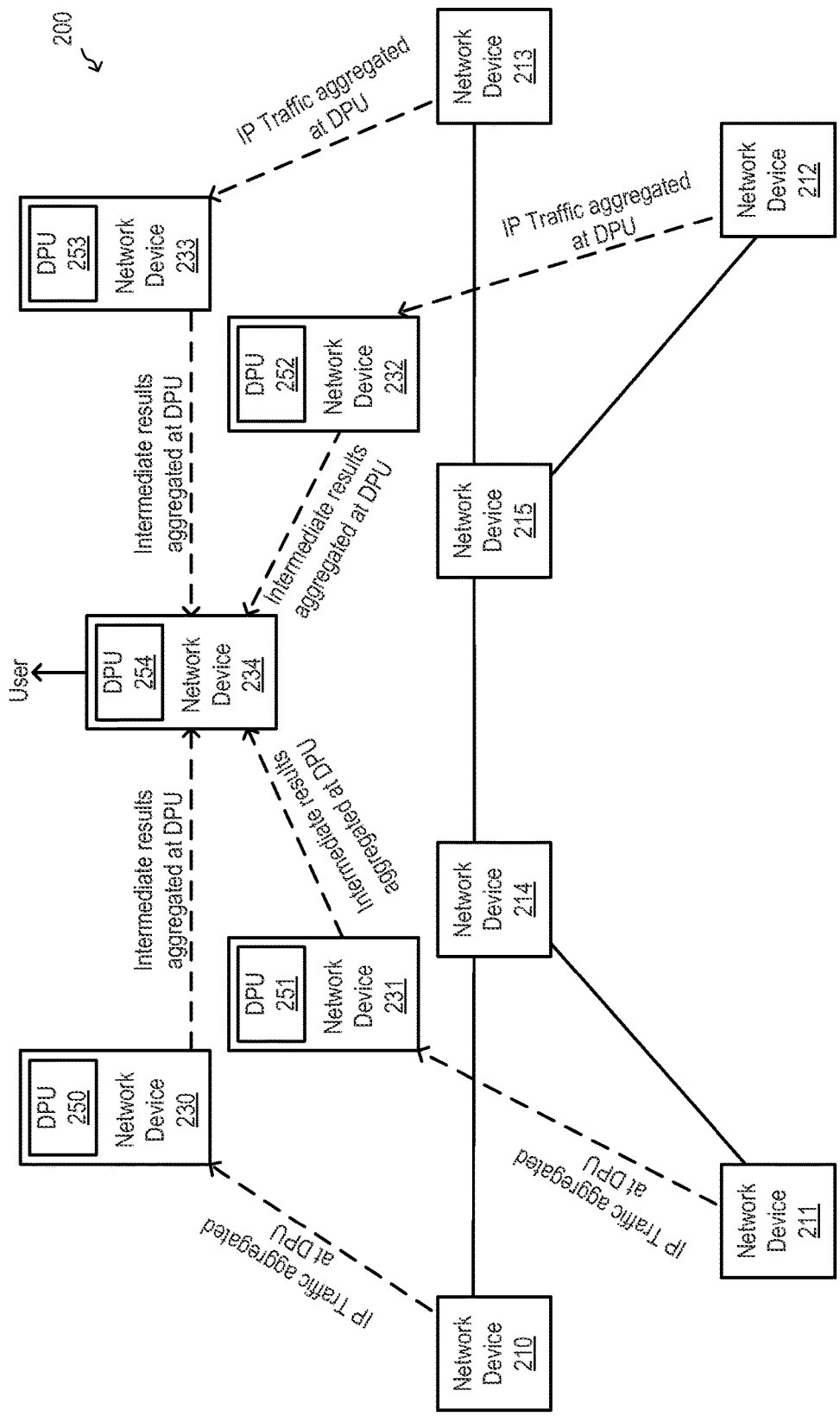
FIG. 2 is a block diagram illustrating a network for aggregating data in a distributed architecture according to one embodiment.

FIG. 2 is a block diagram that illustrates network 200 for aggregating network traffic in a distributed manner according to one embodiment. Network 200 is similar to network 100. For example, network devices 210-211 are communicatively coupled to network device 214, network devices 212-213 are communicatively coupled to network device 215, and network devices 214 and 215 are communicatively coupled to each other. The difference, however, is that in network 200, traffic data are not aggregated at a centralized data center. According to one embodiment, network 200 is partitioned into logical network portions. For example, network device 210 can represent a first portion of network 200, network device 211 can represent a second portion of network 200, etc. As used herein, "representing" a portion of the network refers to the transmitting and receiving of traffic for the network devices that belong to that portion of the network. Each network portion is communicatively coupled to a network device that includes a big data tool for aggregating data from the respective network portion. The intermediate results of these aggregating network devices can be further processed/aggregated by higher level aggregating network devices. Thus, instead of performing data aggregation at a centralized data center, the present invention provides mechanisms for performing data aggregation at or near the source of the data using a hierarchy of data aggregating network devices.

FIG. 2 illustrates a hierarchy of data aggregating network devices 230-234. Each aggregating network device includes a respective data process unit (DPU) module. For example, network device 230 includes DPU 250, network device 231 includes DPU 251, network device 232 includes DPU 252, network device 233 includes DPU 253, and network device 234 includes DPU 254.

Data aggregating network devices 230-234 can be communicatively coupled to any network device of the network where IP traffic is to be received and aggregated. Thus, in the illustrated example, network devices 210-215 can be any type of networking devices, including but not limited to, a radio base station, a WiFi Access Point, a router, a hub, a gateway, etc. It shall be understood that network devices 210-215, 230-234 can be of the same or different types of network devices.

The hierarchy of aggregating network devices (i.e., location of network devices 230-234) is illustrated by way of example and not limitation. One having ordinary skill in the art would recognize that network devices 230-234 can be deployed in other configurations, depending on load balancing, communication cost, etc. As used herein, load balancing refers to the concept of ensuring that traffic exchanged between network devices are balanced in order to prevent most of the traffic from being diverted to a particular network device or group of network devices. As used herein, communication cost refers to the time it takes for traffic to travel from a first network device to a second network device. Communication cost can also refer to the volume of traffic communicated between network devices.

FIG. 2 illustrates, by way of example and not limitation, network device 230 aggregating network traffic from network device 210 representing a first portion of the network, network device 231 aggregating network traffic from network device 211 representing a second portion of the network, network device 232 aggregating network traffic from network device 212 representing a third portion of the network, and network device 233 aggregating network traffic from network device 213 representing a fourth portion of the network. Thus, network devices 230-233 can be understood as a first level of the hierarchy of aggregating network devices. FIG. 2 further illustrates that the intermediate aggregation results of network devices 230-233 are aggregated by network device 234. Thus, network device 234 can be understood as a second level of the hierarchy. It shall be understood that more levels of hierarchy can be added without departing from the broader scope and spirit of the present invention.

According to one embodiment, DPUs 250-254 are responsible for aggregating and processing network traffic data generated by a smaller part/portion of the network, e.g., a wireless local area network (WLAN) deployed in a building or the cellular network in downtown area of a city. The part of the network to be aggregated by a DPU may be determined by geographical area or management domain.

In one aspect of the invention, each DPU executes one or more big data tools (e.g., Hadoop and Spark) and one or more analytic algorithms to process its input dataset and generate some output data. The input dataset may come from output of one part of the network (downstream), and the output data may be sent to another part of the network (upstream) as input, via some protocol, e.g., Hypertext Transfer Protocol (HTTP), HTTP Secure (HTTPS), Extensible Markup Language (XML), JavaScript Object Notation (JSON), etc.

It shall be appreciated that a DPU is an abstraction of computing mechanisms that are capable of processing big data (i.e., data of high volume, speed, and variety). A DPU can be, for example, one computer with multiple parallel cores or processors, or one cluster/datacenter of such computers interconnected by a fast network. Each computer/processor has its own processing unit (that executes code to process data) and storage/memory unit (that stores data and results). In big data technologies, usually one of the processors/computers serves as the point of contact that accepts input data, partitions the data and workload among the entire set of processors/computers, collects results from those nodes, and provides the results to other DPUs or applications.

According to one embodiment, the DPUs can be organized in a hierarchical architecture: DPUs near the edge of the network (or where the data is generated) transform raw input data into intermediate results, which are uploaded to upstream DPUs and transformed into higher-level results. Eventually, the final results are reported to users or fed back to control the network. The intermediate results are a summary of the lower-level input data at significantly reduced volume.

In one embodiment, the DPUs may form a separate data processing network. Alternatively, or in addition, the DPUs can be integrated into as part of an IP network (e.g., a cellular network). For example, in FIG. 2, network devices 230-234 can form a separate data processing network, or they can be part of an IP or cellular network. When separated, the cost of data transmission/communication between a DPU and the part of the network it serves is considerably lower than uploading the data to another DPU. When integrated, a DPU is embedded in or attached to a router, gateway, base station, etc. to process the data it generates. For example, network devices 230-233 can be integrated as part of network devices 210-213, respectively. The configuration/density of DPU deployment is dependent on tradeoffs between performance and costs.

In one embodiment, the sources and sinks of each DPU may be dynamically changed according to factors such as load balancing and data availability. The configuration can be managed as part of the analytic application, e.g., via Application Programming Interfaces (APIs) of a provided library, or done by the platform—OS-like scheduling code that manages all the DPUs and dynamically assign analytic code to DPUs.

As set forth above, the distributed implementation of several network traffic analytics using big data technologies is novel. As will be elaborated, the general pattern is to distribute the code to a network of involved DPUs such that DPUs at the lowest level aggregate and process raw sensory data, higher-level DPUs aggregate and process intermediate results from lower-level DPUs, and so forth until the final results are produced by the DPU at the topmost level.

Figure 3:
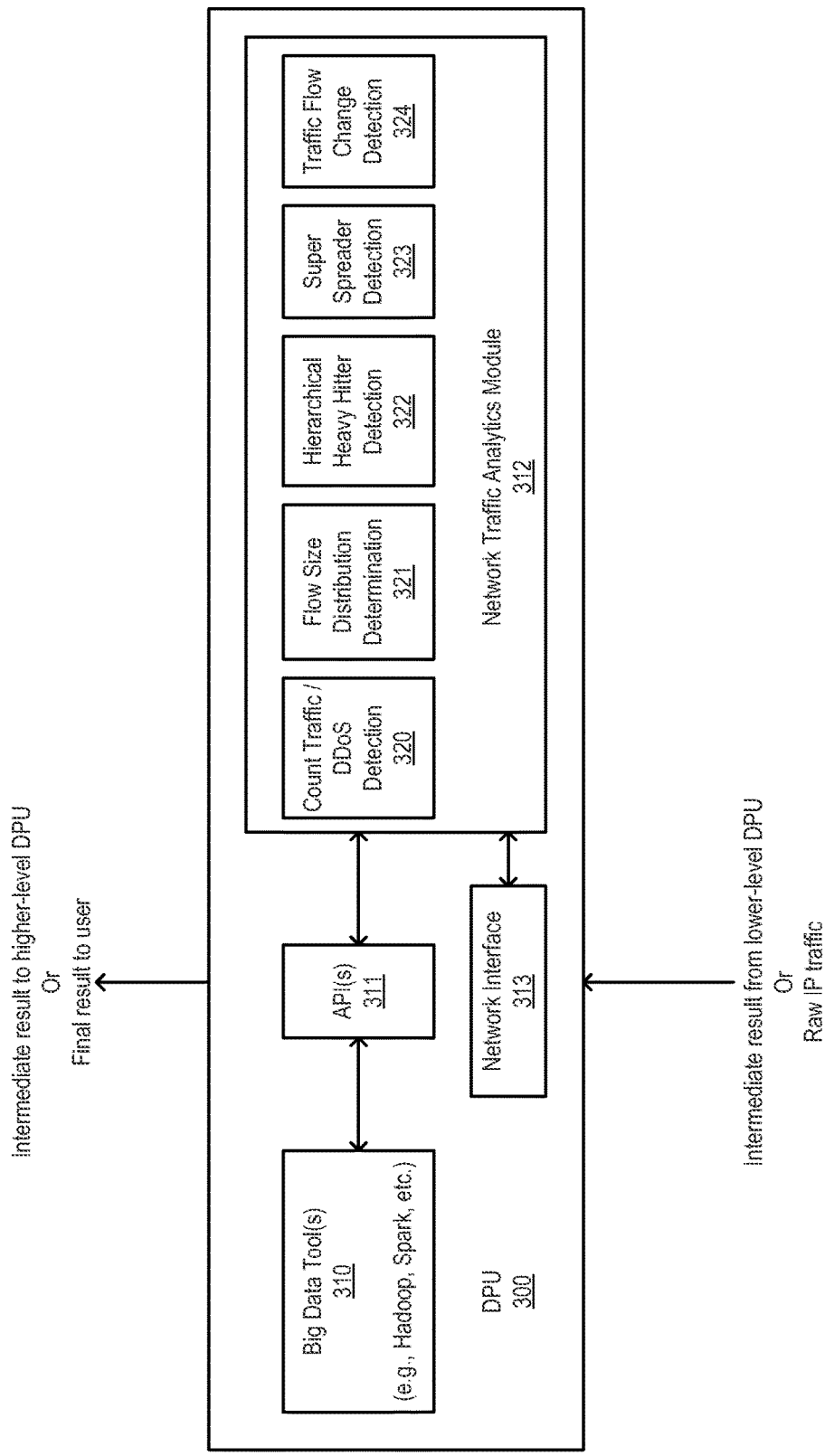
FIG. 3 is a block diagram illustrating a data processing unit module for aggregating data according to one embodiment.

FIG. 3 is a block diagram illustrating DPU 300 according to one embodiment. For example, DPU 300 can be implemented as part of DPUs 250-254, which can be implemented as software, firmware, hardware, or any combination thereof. According to one embodiment, DPU 300 includes network interface 313 for exchanging network traffic. For example, network interface 313 can be used to receive raw network traffic and/or intermediate aggregation results from a lower-level DPU. Network interface 313 can also be used to transmit intermediate aggregation results to a higher-level DPU, and/or final aggregation results to a user/administrator.

According to one embodiment, DPU 300 includes big data tool(s) 310 (e.g., Hadoop, Spark, etc.) for developing big data analytics. Hadoop is currently the industry standard platform for developing big data analytics. The Hadoop stack consists of a suite of open-source tools, including Hadoop Distributed File System (HDFS), Yet Another Resource Negotiator (YARN), MapReduce, Hive, HBase, and Mahout. Hadoop treats failures as a norm rather than an exception and builds large-scale parallel/distributed computing applications on a large cluster of commodity computers. The large input dataset is split into 64 Mega Byte (MB) or 128 MB blocks, each replicated on several of those computers in the cluster. Its programming abstraction allows users to specify "map" and "reduce" tasks. The scheduler at run time partitions the input dataset and spawns those tasks on the computers to process the data depending on data locality and data dependency. If some of the computers fail or data is lost, the corresponding tasks are restarted on other computers for fault-tolerance.

The Hadoop stack was originally an open-source reimplementation of a similar stack developed at Google, which is not open-source. There are several recent open-source projects that improve performance of the Hadoop stack. The most prominent is the Berkeley Data Analytic Stack (BDAS), which includes tools such as Tachyon, Mesos, Spark, Shark, GraphX, Stream, and MLBase. BDAS focuses on in-memory optimizations: Part of the input dataset is cached in the main memory and processed significantly faster than the disk-oriented data processing in Hadoop.

As set forth above, Spark is part of the BDAS platform. Its main programming abstraction is resilient distributed dataset (RDD) which allocates a chunk of main memory on chosen nodes of a cluster and distributes the input or output dataset (e.g., large disk files) into those chunks. Fault-tolerance is automatically handled in RDD/Spark. Throughout the description, analytic algorithms and pseudo code are presented using the Scala API of Spark due to its conciseness. It shall be appreciated that the present invention is not so limited. One having ordinary skill in the art would recognize that other big data tools can be used to implement the algorithms set forth in this description.

In one embodiment, DPU 300 includes API(s) 311 for implementing big data analytics using big data tool(s) 310. In at least one embodiment, DPU 300 includes network traffic analytics module 312 that include one or more algorithms for aggregating/characterizing network traffic using big data tool(s) 310 via API(s) 311. In the illustrated embodiment, network traffic analytics module 312 includes algorithms 320-324, which are described in further details below.

Figure 4:
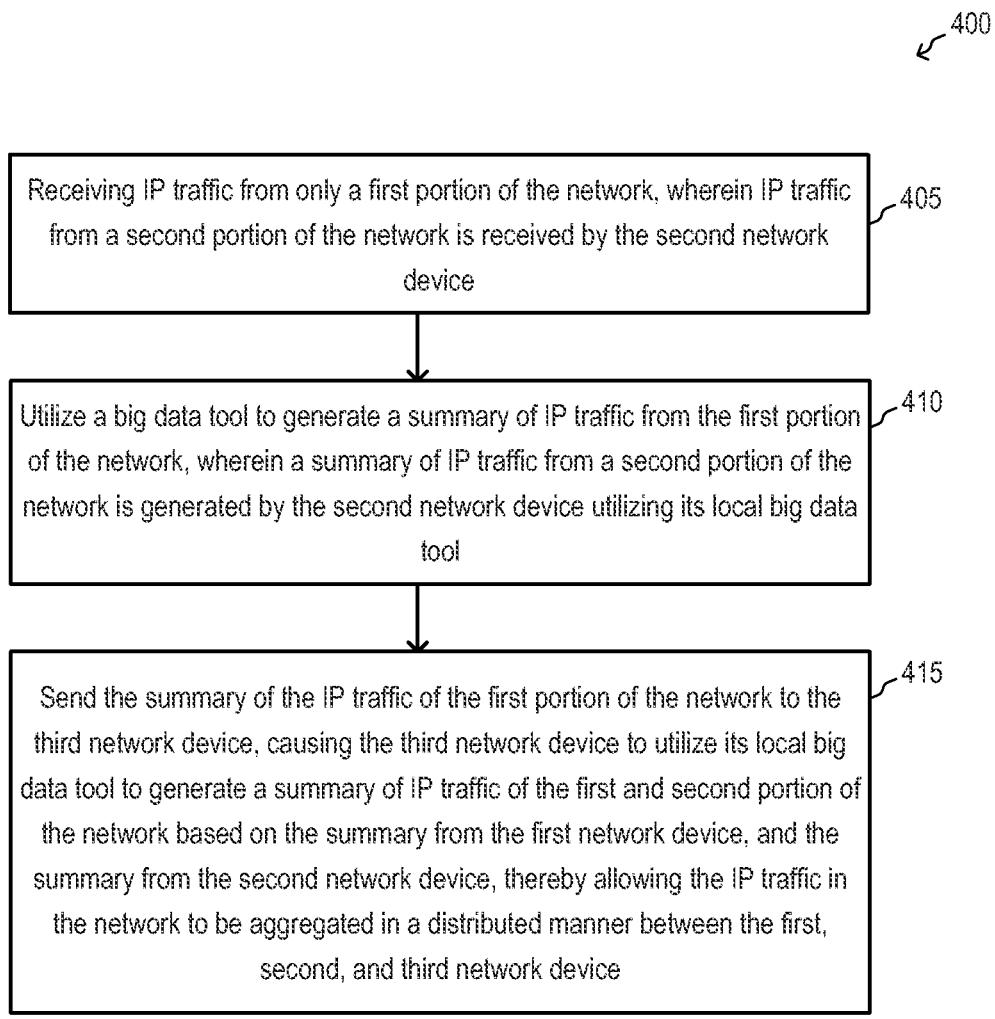
FIG. 4 is a flow diagram illustrating a method for aggregating data according to one embodiment.

FIG. 4 is a flow diagram illustrating method 400 for performing distributed data aggregation according to one embodiment. For example, method 400 can be performed by a first network device, such as network device 230 (e.g., DPU 250 of network device 230), which can be implemented as software, firmware, hardware, or any combination thereof.

Referring now to FIG. 4, at block 405, the first network device receives IP traffic from only a first portion of the network, wherein IP traffic from a second portion of the network is received by a second network device (e.g., network device 231), wherein the first and second network devices are communicatively coupled to a third network device (e.g., network device 234). For example, network device 230 receives IP traffic from network device 210 representing a first portion of the network, and network device 231 receives IP traffic from network device 211 representing a second portion of the network.

At block 410, the first network device utilizes a big data tool (e.g., hadoop, spark, etc.) to generate a summary of the IP traffic from the first portion of the network, wherein a summary of IP traffic from a second portion of the network is generated by the second network device utilizing its local big data tool. For example, network device 230 utilizes a big data tool to analyze and aggregate IP traffic received from network device 210. The nature of the aggregation and the types of summary that is generated depends on the analytics (e.g., analytic algorithms 320-324) that are to be performed. Analytics are described in further details below.

At block 415, the first network device sends the summary of the IP traffic of the first portion of the network to the third network device, causing the third network device to utilize its local big data tool to generate a summary of the IP traffic of the first and second portion of the network based on the summary from the first network device and the summary from the second network device, thereby allowing the IP traffic in the network to be aggregated/characterized in a distributed manner between the first, second, and third network device.

Figure 5:
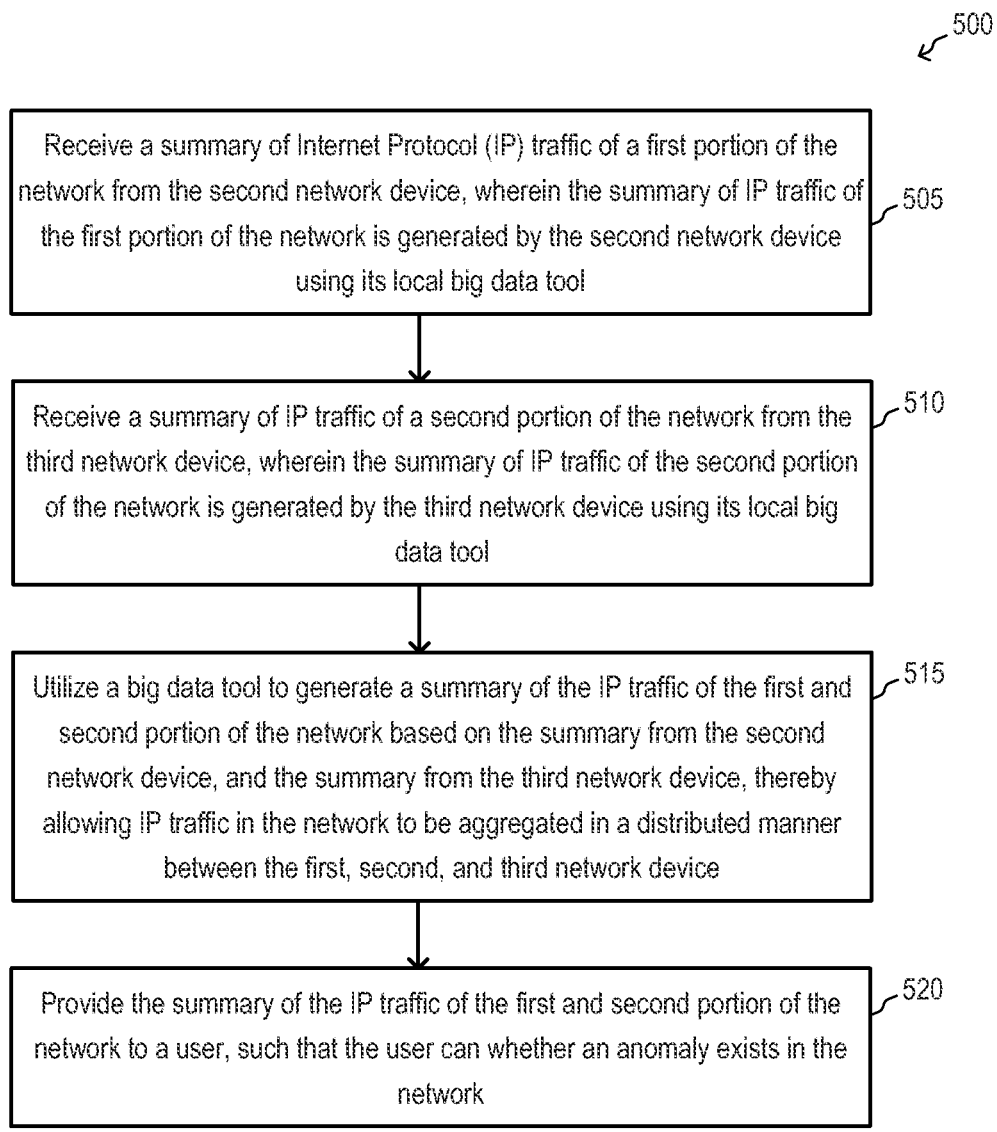
FIG. 5 is a flow diagram illustrating a method for aggregating data according to one embodiment.

FIG. 5 is a block diagram illustrating method 500 for performing distributed data aggregation according to one embodiment. For example, method 500 can be performed by a first network device, such as network device 234 (e.g., DPU 254 of network device 234), which can be implemented as software, firmware, hardware, or any combination thereof.

Referring now to FIG. 5, at block 505, the first network device receives a summary of IP traffic of a first portion of the network from the second network device (e.g., network device 230), wherein the summary of IP traffic of the first portion of the network is generated by the second network device using its local big data tool.

At block 510, the first network device receives a summary of IP traffic of a second portion of the network from the third network device (e.g., network device 231), wherein the summary of IP traffic of the second portion of the network is generated by the third network device using its local big data tool.

At block 515, the first network device utilizes a big data tool to generate a summary of the IP traffic of the first and second portion of the network based on the summary from the second network device, and the summary from the third network device, thereby allowing IP traffic in the network to be aggregated/characterized in a distributed manner between the first, second, and third network device. At block 520, the first network device provides the summary of the IP traffic of the first and second portion of the network to a user, such that the user can determine whether an anomaly exists in the network.

Analytic Modules

Various embodiments of network traffic analytic modules 320-324 will now be discussed. The modules discussed herein are for purposes of illustration, and not intended to be limitations of the present invention. One having ordinary skill in the art would recognize that other analytic modules can be included as part of DPU 300 without departing from the broader scope and spirit of the present invention.

Count Traffic and Distributed Denial of Service (DDoS) Attack Detection Module

FIGS. 6A and 6B are diagrams illustrating pseudo codes for performing count traffic/distributed denial of service (DDoS) attack detection in a centralized and distributed architecture, respectively. FIG. 6A is a diagram illustrating pseudo code 600 for the centralized architecture according to one embodiment. For example, pseudo code 600 can be implemented as part of count traffic/DDoS attack detection module 320, which can be implemented as software, firmware, hardware, or any combination thereof.

In a DDoS attack, the attacker saturates the victim's resource by the use of multiple hosts to launch a coordinated attack against a single victim. It consumes the resources of a remote host and/or network in an effort to deny the use of those resources to legitimate users. By exploiting existing software flaws, it can cause remote hosts to either crash or significantly degrade in performance.

In one embodiment, a DDoS attack is detected by counting the distinct (i.e., unique) number of source IP addresses of devices that send traffic to one or a set of destinations in a fixed time window. The goal is to identify the set of destinations that receive traffic from more than some number of distinct sources. This reveals a possible set of victims.

As shown in FIG. 6A, pseudo code 600 assumes the input raw dataset in question is loaded in a distributed data structure (namely, resilient distributed dataset (RDD) in the terminology of Spark), ipTuples. For example, the input raw dataset can be contained in the IP traffic received from the portion of the network that the DPU represents. Each of the tuples is of type IPPacket that has several attributes. By performing operation 605, the module first extracts a key-value pair of destination (dst) and source (src) addresses from each input tuple that describes an IP packet. Then, by performing operation 610, the module groups all such pairs by the key (i.e., dst) such that, in the resulting distributed data structure, each tuple has a key (dst) and a sequence of sources that send packets to that dst. Thirdly, by performing operation 615, for each dst, it counts how many unique sources are in the sequence. Finally, by performing operation 620, the module sorts the results by the unique counts and outputs the top-k destinations with the largest k number of sources.

FIG. 6B is a diagram illustrating pseudo code 601 for performing count traffic/DDoS attack detection in a distributed architecture according to one embodiment. For example, pseudo code 601 can be implemented as part of count traffic/DDoS attack detection module 320. Pseudo code 601 performs operations similar to those performed by pseudo code 600, except that pseudo code 601 is partitioned such that it can be performed by multiple DPUs of multiple network devices in a distributed manner. For example, the operations of snippet 602 of pseudo code 601 can be performed by a low-level DPU, and the operations of snippet 603 of pseudo code 601 can be performed by a high-level DPU.

In the distributed architecture, each low-level DPU i takes input raw dataset ipTuples_i and processes the data similarly to the centralized architecture. The resulting summary of the dataset, dstCounts_i, is uploaded to the high-level DPU. There are N such low-level DPUs. Then, by performing operation 625, the high-level DPU aggregates all the N received dstCounts_i as its input. The resulting distributed data structure includes all pairs of (dst, count), which are unique in the output of each source DPU but may no longer be distinct with regard to dst's when aggregated from multiple source DPUs. As part of operation 630, by applying an operator similar to "reduceByKey(_+_)", for each unique key (i.e., dst), the module sums up all the count values (i.e., sources) if there are multiple of those. Hence, each resulting pair is the number of unique sources for each dst. Finally, the top-k destinations are provided to the user, such that the user can determine whether there is a possible DDoS attack.

The distributed architecture for performing count traffic/DDoS attack detection will now be illustrated by way of example. In the following example, it is assumed that snippet 602 is performed by DPUs 250 and 251 of network devices 230 and 231, respectively. The example further assumes that snippet 603 is performed by DPU 254 of network device 234.

Assume that the raw IP data has been received by DPU 250, and that the ipTuples is transformed into the following values by performing operation 605:
{DST-10, SRC-20}, {DST-11, SRC-21}, and {DST-10, SRC-20}.

After snippet 602 has been performed by DPU 250, the dstCounts_i sent to DPU 254 are:
{DST-10, 2} and {DST-11, 1}
which indicate that there are two unique sources for key DST-10, and one unique source for key DST-11.

Assume that the raw IP data has been received by DPU 251, and that the ipTuples is transformed into the following values after performing operation 605:
{DST-10, SRC-30}, {DST-11, SRC-31}, and {DST-12, SRC-32}.

After snippet 602 has been performed by DPU 251, the dstCounts_i sent to DPU 254 are:
{DST-10, 1}, {DST-11, 1}, and {DST-12, 8}
which indicate that there is one unique source for key DST-10, one unique source for key DST-11, and eight unique sources for key DST-12.

Assume that the dstCounts_i's from DPUs 250 and 251 have been received by DPU 254. After performing operation 625, the input contains the following values:
{DST-10, 2}, {DST-11, 1}, {DST-10, 1}, {DST-11, 1}, and {DST-12, 8}.

Note that the key dst's are not unique. However, after performing operation 630, DPU 254 reduces the input to the following dstCount pairs:
{DST-10, 3}, {DST-11, 2}, and {DST-12, 8}.

According to one embodiment, DPU 254 performs operation 635 to sort the dstCount in descending order of the count, and provides the sorted dstCount pairs to the user as:
{DST-12, 8}, {DST-10, 3}, and {DST-11, 2}
which indicate that there are 8 unique sources for key DST-12, 3 unique sources for key DST-10, and 2 unique sources for key DST-11.

Flow Size Distribution Determination

FIGS. 7A and 7B are diagrams illustrating pseudo codes for performing flow size distribution determination in a centralized and distributed architecture, respectively. FIG. 7A is a diagram illustrating pseudo code 700 for the centralized architecture according to one embodiment. For example, pseudo code 700 can be implemented as part of flow size distribution determination module 321, which can be implemented as software, firmware, hardware, or any combination thereof.

Knowing the distribution of the flow sizes in a network is useful for network operators to understand their network resource usage, characterize the traffic demands, detect traffic anomalies, and perform better traffic engineering mechanisms. For example, an Internet Service Provider (ISP) can use flow distribution to infer the usage of their network. It can be used for billing, pricing, infrastructure engineering, resource planning. It can also be used to infer the type of applications, e.g., how much traffic are using streaming video which are usually long flows and how much are using voice over IP. Further, sudden changes in flow size distribution in the network may be caused by failures or performance problems in the network. Thus, flow size distribution information can be used as another source for fault detection.

For example, given a flow size s, or a flow size range [s1:s2], we can compute the number of flows whose sizes match s, or whose size is larger than s1 and smaller than s2, within a fixed time interval T. Such knowledge can help understand the distribution of different sizes of flows, e.g. elephant flows, mice flows, etc., in the network.

As shown in FIG. 7A, the centralized architecture assumes that the input dataset is loaded in a distributed data structure, ipTuples. Each of the tuples is of type IPPacket that has several attributes. For each tuple, we construct a pair of flow (e.g., of type Flow with attributes src, dst, srcport, dstport, and protocol) and the size of the packet payload. Then, we apply operator reduceByKey, which for each unique flow sums up all the payload sizes in bytes. The result is a distributed data structure, flowBytes, in which each tuple is a flow with byte size. Finally, we can classify the flow bytes by a coarser granularity, e.g., >1 GB, 100 KB-1 GB, 10 KB-100 KB, 1 KB-10 KB, <1 KB. Further, we can output the classified flows by some order or desired range.

FIG. 7B is a diagram illustrating pseudo code 701 for performing flow size distribution determination in a distributed architecture according to one embodiment. For example, pseudo code 701 can be implemented as part of flow size distribution determination module 321. Pseudo code 701 performs operations similar to those performed by pseudo code 700, except that pseudo code 701 is partitioned such that it can be performed by multiple DPUs of multiple network devices in a distributed manner. For example, the operations of snippet 702 of pseudo code 701 can be performed by a low-level DPU, and the operations of snippet 703 of pseudo code 701 can be performed by a high-level DPU.

As shown in FIG. 7B, the distributed architecture assumes there are N low-level DPUs and one high-level DPU. Each low-level DPU_i processes its input dataset ipTuples_i similarly to the centralized version. The output summary flowBytes_i is uploaded to the high-level DPU. The high-level DPU aggregates the N downstream summaries flowBytes_i, i=1, 2, . . . , N in one distributed data structure as input. It then applies the reduceByKey operator on the input to sum up the flow bytes for each distinct flow. Finally, the resulting flowBytes is classified and output.

The distributed architecture for performing flow size distribution determination will now be illustrated by way of example. In the following example, it is assumed that snippet 702 is performed by DPUs 250 and 251 of network devices 230 and 231, respectively. The example further assumes that snippet 703 is performed by DPU 254 of network device 234.

Assume that the raw IP data has been received by DPU 250, and that the ipTuples is transformed into the following values after performing the map operation:
{FLOW-10, 100}, {FLOW-20, 200}, and {FLOW-10, 500}.

After DPU 250 performs the subsequent reduceByKey operation, the flowBytes_i sent to DPU 254 are:
{FLOW-10, 600} and {FLOW-20, 200},
which indicates that there are two distinct flows, one identified by key FLOW-10 and the other by FLOW-20, that account for 600 bytes and 200 bytes of traffic, respectively, in the portion of the network monitored by network device 230 and DPU 250.

Assume that the raw IP data has been received by DPU 251, and that the ipTuples is transformed into the following values after performing the map operation:
{FLOW-10, 300}, {FLOW-30, 100}, and {FLOW-30, 150}.

After DPU 252 performs the subsequent reduceByKey operation the flowBytes_i sent to DPU 254 are:
{FLOW-10, 300} and {FLOW-30, 250},
which indicates that there are two distinct flows, one identified by key FLOW-10 and the other by key FLOW-30, that account for 300 bytes and 250 bytes, respectively, in the portion of the network monitored by network device 231 and DPU 251.

Assume that the flowBytes_i's from DPUs 250 and 251 have been received by DPU 254. After performing the union operation in code snippet 703, the input contains the following values:
{FLOW-10, 600}, {FLOW-20, 200}, {FLOW-10, 300}, and {FLOW-30, 250}.

Note that the flow keys are not unique. However, after performing the subsequent reduceByKey operation in snippet 703, the DPU 254 reduces the input to the following flowBytes pairs:
{FLOW-10, 900}. {FLOW-20, 200}, and {FLOW-30, 250}.

Then, DPU 254 will output those pairs according to some selection criteria. For example, if the user wants to see flows with size of over 512 bytes, only FLOW-10 will be shown.

Hierarchical Heavy Hitter Detection

FIGS. 8A and 8B are diagrams illustrating pseudo codes for performing hierarchical heavy hitter (HHH) detection in a centralized and distributed architecture, respectively. FIG. 8A is a diagram illustrating pseudo code 800 for the centralized architecture according to one embodiment. For example, pseudo code 800 can be implemented as part of HHH detection module 322, which can be implemented as software, firmware, hardware, or any combination thereof.

Detecting high-volume traffic clusters in near real-time is important in various network management tasks, such as traffic monitoring, accounting, and network anomaly detection. The heavy hitter is often hierarchical, meaning that it can be defined at different aggregation levels of IP addresses. It can also be multidimensional, as the heavy hitter detection can be defined from combination of different IP header fields such as IP addresses, port numbers, and protocol. It is challenging to examine all possible combinations of aggregates in order to detect all the heavy hitters using a single server, because of the limitation in computation and storage resources.

As used herein, a heavy hitter is a set of flows, which accounts for at least k proportion of the total measured traffic in a set of links, which can be measured in packets, bytes, connections, etc. A heavy hitter can be an individual flow or connection, or an aggregation of multiple flows/connections. Each flow in the aggregate may not necessarily be a heavy hitter by itself. Aggregations can be defined on one or more dimensions, e.g., source IP address, destination IP address, source port, destination port, and protocol fields for IP flows.

The Hierarchical Heavy Hitters (HHH) is defined as the longest IP prefixes that contribute a large amount of traffic, for example, at least a fraction k of link capacity, or k fraction of all the network traffic, after excluding any HHH descendants.

A simple solution to the HHH problem is to run an offline algorithm over the traffic counts for all leaf nodes in the tree in a single machine. However, this approach is slow and is not scalable to a large traffic size.

As shown in FIG. 8A, the centralized architecture assumes that the input dataset is loaded in a distributed data structure, ipTuples. For simplicity, we only consider the src and dst addresses for each packet. Suppose that function dissect(src, dst) produces a set of hierarchical combinations of the prefixes of the src and dst IP addresses. For example, for a pair of IPv4 addresses, there are 16 combinations. Then, for each resulting pair, we generate and store the pair and the number of payload bytes (len) in the distributed data structure hhh. The flatMap operator simply combines all the resulting pairs in one data structure hhh. Then, we apply operator reduceByKey to sum up the number of payload bytes for each address prefix pair, which denotes one potential heavy hitter. Finally, we output hhh with some further transformation, e.g., by sorting the pairs by size, excluding unimportant descendants.

FIG. 8B is a diagram illustrating pseudo code 801 for performing HHH detection in a distributed architecture according to one embodiment. For example, pseudo code 801 can be implemented as part of HHH detection module 322. Pseudo code 801 performs operations similar to those performed by pseudo code 800, except that pseudo code 801 is partitioned such that it can be performed by multiple DPUs of multiple network devices in a distributed manner. For example, the operations of snippet 802 of pseudo code 801 can be performed by a low-level DPU, and the operations of snippet 803 of pseudo code 801 can be performed by a high-level DPU.

As shown in FIG. 8B, the distributed architecture assumes there are N low-level DPUs and one high-level DPU. Each low-level DPU_i processes its input dataset ipTuples_i similarly as in the centralized version. The resulting hhh_i's are aggregated at the high-level DPU, which simply applies operator reduceByKey to sum up the payload sizes for each distinct address pair. Finally, we output the resulting hhh after some further transformation as in the centralized version.

The distributed architecture for performing HHH detection will now be illustrated by way of example. In the following example, it is assumed that snippet 802 is performed by DPUs 250 and 251 of network devices 230 and 231, respectively. The example further assumes that snippet 803 is performed by DPU 254 of network device 234.

Assume that the raw IP data has been received by DPU 250, and that the ipTuples contain the following values (with only fields src, dst, and len in each tuple while the other fields are omitted for the sake of brevity):

{(1.2.3.4, 5.6.7.8, 100)}.

Calling function dissect(1.2.3.4, 5.6.7.8} yields the following 16 combinations of IP address prefix pairs:

{(1.2.3.4, 5.6.7.8), (1.2.3.4, 5.6.7), (1.2.3.4, 5.6), (1.2.3.4, 5),
(1.2.3, 5.6.7.8), (1.2.3, 5.6.7), (1.2.3, 5.6), (1.2.3, 5),
(1.2, 5.6.7.8), (1.2, 5.6.7), (1.2, 5.6), (1.2, 5),
(1, 5.6.7.8), (1, 5.6.7), (1, 5.6), (1, 5)}

The subsequent map operation yields the following 16 tuples, accordingly, which associate the payload size 100 to every pair of src and dst prefixes:

{((1.2.3.4, 5.6.7.8), 100), ((1.2.3.4, 5.6.7), 100), ((1.2.3.4, 5.6), 100), ((1.2.3.4, 5), 100),
((1.2.3, 5.6.7.8), 100), ((1.2.3, 5.6.7), 100), ((1.2.3, 5.6), 100), ((1.2.3, 5), 100),
((1.2, 5.6.7.8), 100), ((1.2, 5.6.7), 100), ((1.2, 5.6), 100), ((1.2, 5), 100),
((1, 5.6.7.8), 100), ((1, 5.6.7), 100), ((1, 5.6), 100), ((1, 5), 100)}

Applying operation flatMap to the above set will produce the same set because there is only one input set in this simple example. If there are two or more sets, the flatMap result will be a union of all those sets. Note that here the key is the (src, dst) prefix pair. Since every key is unique, after applying operation reduceByKey, the resulting set hhh_i is also the same as the above set. This set is then sent to DPU 254.

Assume that the raw IP data has been received by DPU 251, and that the ipTuples contains the following values (with only fields src, dst, and len in each tuple while the other fields are omitted for the sake of brevity):

{(1.2.3.5, 5.6.7.8, 300)}.

Similarly to the above, after applying the flatMap and reduceByKey operations, the resulting hhh_i set contains the following 16 key-value pairs:

{((1.2.3.5, 5.6.7.8), 300), ((1.2.3.5, 5.6.7), 300), ((1.2.3.5, 5.6), 300), ((1.2.3.5, 5), 300),
((1.2.3, 5.6.7.8), 300), ((1.2.3, 5.6.7), 300), ((1.2.3, 5.6), 300), ((1.2.3, 5), 300),
((1.2, 5.6.7.8), 300), ((1.2, 5.6.7), 300), ((1.2, 5.6), 300), ((1.2, 5), 300),
((1, 5.6.7.8), 300), ((1, 5.6.7), 300), ((1, 5.6), 300), ((1, 5), 300)}

After the above two hhh_i sets are sent to DPU 254, applying the union operation in code snippet 803 will yield a union of the two sets.

Then by applying operation reduceByKey in snippet 803, the resulting set hhh as follows will be generated, which sums up the sizes in pairs with the same keys:

{((1.2.3.4, 5.6.7.8), 100), ((1.2.3.4, 5.6.7), 100), ((1.2.3.4, 5.6), 100), ((1.2.3.4, 5), 100),
((1.2.3.5, 5.6.7.8), 300), ((1.2.3.5, 5.6.7), 300), ((1.2.3.5, 5.6), 300), ((1.2.3.5, 5), 300),
((1.2.3, 5.6.7.8), 400), ((1.2.3, 5.6.7), 400), ((1.2.3, 5.6), 400), ((1.2.3, 5), 400),
((1.2, 5.6.7.8), 400), ((1.2, 5.6.7), 400), ((1.2, 5.6), 400), ((1.2, 5), 400),
((1, 5.6.7.8), 400), ((1, 5.6.7), 400), ((1, 5.6), 400), ((1, 5), 400)}

In the final output, after cleaning up unimportant descendants in the address prefix combinations, the above set will be presented to the user in a more concise and meaningful way. One possible output is {((1.2.3, 5.6.7.8), 400)}, which indicates that source addresses in domain 1.2.3 altogether send 400 bytes of data to destination address 5.6.7.8. Hence IP domain 1.2.3 is a potential heavy hitter.

Super Spreader Detection/WORM Detection

FIGS. 9A and 9B are diagrams illustrating pseudo codes for performing super spreader/worm detection in a centralized and distributed architecture, respectively. FIG. 9A is a diagram illustrating pseudo code 900 for the centralized architecture according to one embodiment. For example, pseudo code 900 can be implemented as part of super spreader detection module 323. FIG. 9B is a diagram illustrating pseudo code 901 for the distributed architecture according to one embodiment. For example, pseudo code 901 can be implemented as part of super spreader detection module 323. Pseudo code 901 performs operations similar to those performed by pseudo code 900, except that pseudo code 901 is partitioned such that it can be performed by multiple DPUs of multiple network devices in a distributed manner. For example, the operations of snippet 902 of pseudo code 901 can be performed by a low-level DPU, and the operations of snippet 903 of pseudo code 901 can be performed by a high-level DPU.

Internet attacks such as DDoS attacks and worm attacks are increasing in severity. Network security monitoring can play an important role in defending and mitigating such large-scale Internet attacks. It can be used to identify misbehaving hosts or victims being attacked, and to develop appropriate filters to throttle attack traffic automatically. For example, a compromised host performing fast scanning to propagate a worm often makes an unusually high number of connections to distinct destinations within a short time. The identified potential attackers can be used to trigger the network logging system to log attacker traffic for detailed real-time and post-mortem analysis of attacks, and can also be used to help develop filters that throttle subsequent attack traffic in real-time.

During fast scanning for worm propagation, a compromised host may try to connect to a high number of distinct hosts in order to spread the worm. We define a host h to be a super spreader if h sends traffic to more than k unique destinations during a fixed time interval T. k and h are configurable parameters to the algorithm. If a source makes multiple connections or sends multiple packets to the same destination within the time window, the source-destination connection will be counted only once. This is because there are legitimate communication patterns where a source either makes several connections to the same destination within a time window such as webpage downloads.

By identifying in real-time any source IP address that makes an unusually high number of distinct connections within a short time, a network-monitoring node can identify hosts that may be super spreaders, and take appropriate action. Detecting super spreaders is important to stop worm propagation. Thus, detecting them early is of paramount importance. In one embodiment, given a sequence of packets, we would like to design an efficient monitoring mechanism to identify in real-time which source IP addresses have contacted a high number of distinct hosts within a time window. This is a difficult problem on a high-speed monitoring node, as there may be millions of legitimate flows passing by per minute and the attack traffic may be an extremely small portion.

The centralized and distributed architectures for performing super spreader and worm detection shown in FIGS. 9A and 9B, respectively, are similar to the respective architectures of count traffic/DDoS detection module 320. The difference is that in module 323, the source IP addresses (src) are used as the key instead of destination IP addresses (dst).

Traffic Flow Change Detection

FIGS. 10A and 10B are diagrams illustrating pseudo codes for performing traffic flow change detection in a centralized and distributed architecture, respectively. FIG. 10A is a diagram illustrating pseudo code 1000 for the centralized architecture according to one embodiment. For example, pseudo code 1000 can be implemented as part of traffic flow change detection module 324. FIG. 10B is a diagram illustrating pseudo code 1001 for the distributed architecture according to one embodiment. For example, pseudo code 1001 can be implemented as part of traffic flow change detection module 324. Pseudo code 1001 performs operations similar to those performed by pseudo code 1000, except that pseudo code 1001 is partitioned such that it can be performed by multiple DPUs of multiple network devices in a distributed manner. For example, the operations of snippet 1002 of pseudo code 1001 can be performed by a low-level DPU, and the operations of snippet 1003 of pseudo code 1001 can be performed by a high-level DPU.

The detection of various attacks typically treats the traffic as a collection of flows and looks for heavy changes in traffic patterns and volumes. Given today's traffic volume and link speeds, the detection method has to be able to handle potentially several millions or more of concurrent network flows.

According to one embodiment of traffic change detection module 324, the module breaks up the sequence of data items into two temporally adjacent windows. We are interested in keys whose signals differ dramatically in size when taken over the first window versus the second window. The module detects traffic anomalies by deriving a model of normal behavior based on the past traffic history and looking for significant changes in short-term behavior on the order of minutes to hours that are inconsistent with the model.

As shown in FIG. 10A, the module partitions the input dataset by time windows of the same length of time interval (e.g., 10 minutes). Each time window of data is loaded in a RDD. For any two consecutive time windows, ipTuples(k) and ipTuples(k+1), we call an algorithm (similar to the algorithm for determining flow size distribution described above) to compute the flow bytes, yielding flowBytes(k) and flowBytes(k+1), respectively. Then we compute the delta by flowChanges(k, k+1)=flowBytes(k+1)−flowBytes(k). The computation is similar to set difference: for every new flow that appears in flowBytes(k+1) but not in flowBytes(k), the bytes is positive; for every flow in flowBytes(k) but not flowBytes(k+1), the bytes is negative; for every flow that appears in both, the difference in bytes could be positive, negative or zero. In the end, the module outputs those changes that are interesting by some criteria, e.g., in descending order of amount of absolute changes.

As shown in FIG. 10B, since the computation of flowBytes and flowChanges are commutative, it can be implemented similarly as the other four categories of analytics (modules 320-323) described above. The low-level DPUs upload the computed flowChanges to the high-level DPU, which in turn aggregates all the N flowChanges and applies the reduceByKey operator.

The distributed architecture for performing traffic flow change detection will now be illustrated by way of example. In the following example, it is assumed that snippet 1002 is performed by DPUs 250 and 251 of network devices 230 and 231, respectively. The example further assumes that snippet 1003 is performed by DPU 254 of network device 234.

Assume that the raw IP data has been received by DPU 250 in time window k, and that the ipTuples_250(k) is transformed into flowBytes(k) with the following values:
{(FLOW-10, 600), (FLOW-20, 200)}

Assume that the raw IP data has been received by DPU 250 in the next time window k+1 and that the ipTuples_250(k+1) is transformed into flowBytes(k+1) with values:
{(FLOW-10, 300), (FLOW-30, 250)}

At end of time window k+1, DPU 250 computes the difference flowChanges_250(k+1, k)=flowBytes(k+1)−flowBytes(k), with the following values:
{(FLOW-10, −300), (FLOW-20, −200), (FLOW-30, 250)}, Where FLOW-10's size decreases by 300 bytes, FLOW-20's size decreases by 200 bytes, while FLOW-30's size increases by 250 bytes over the last time window.

Assume that the raw IP data has been received by DPU 251 in time window k, and the ipTuples_251(k) is transformed into flowBytes(k) with the following values:
{(FLOW-10, 200), (FLOW-20, 100)}.

Assume that the raw IP data has been received by DPU 251 in the next time window k+1 and that the ipTuples_251(k+1) is transformed into flowBytes(K+1) with values:
{(FLOW-20, 600), (FLOW-40, 200)}.

At the end of time window k+1, DPU 251 computes the difference flowChanges_251(k+1)=flowBytes(k+1)−flowBytes(k), with the following values:
{(FLOW-10, −200), (FLOW-20, 500), (FLOW-40, 200)}, Where FLOW-10's size decreases by 200 bytes, FLOW-20's size increases by 500 bytes and FLOW-40's size increases by 200 bytes over the last time window.

The above two flow changes, flowChanges_250 and flowChanges_251, are sent from DPU-250 and DPU 251, to DPU 254, respectively. DPU 254 aggregates the two input datasets and the union input includes the following values:

{(FLOW-10, −300), (FLOW-20, −200), (FLOW-30, 250), (FLOW-10, −200), (FLOW-20, 500), (FLOW-40, 200)}.

Then, DPU 254 applies operation reduceByKey to the input, which yields the aggregated flowChanges(k, k+1) as follows:

{(FLOW-10, −500), (FLOW-20, 300), (FLOW-30, 250), (FLOW-40, 200)}.

Finally, DPU 254 outputs the flow changes according to some user-defined criteria. For example, the top-4 flow changes by absolute values will be FLOW-10, FLOW-20, FLOW-30, and FLOW-40 in descending order.

FIG. 11 is a block diagram illustrating the general design patterns when mapping each of the analytic described above to a distributed network of DPUs. When some big data technology (e.g., Spark/BDAS) is used, the implementation of each analytic becomes very straightforward on a cluster of commodity computers. The centralized architectures are very similar between different analytics: load the input dataset; apply user-defined map and reduce functions that extract key-value pairs from the input dataset and for each key aggregate the values, respectively; then output the results to the user or the storage system. For each type of analytic, the differences are mainly in the user-defined map, reduce and output functions. In the distributed architecture of each case, the code of the low-level DPU is almost the same as its centralized version except that the output of results is replaced by uploading the results to higher-level DPUs. Further, in the distributed architecture of each case, the code of the high-level DPUs are also almost the same: it aggregates intermediate results from all the lower-level DPUs and applies the operator reduceByKey to sum up corresponding counts for each distinct key (e.g., flow id). Moreover, in the distributed architecture of each case, the higher-level DPUs could be easily extended with more levels than two (that is given as an example). A next-level DPU just works the same way by aggregating intermediate results from its lower-level DPUs, applying operator reduceByKey, and then uploading the results to yet another higher level of DPU. At the highest level, in addition to aggregating and reducing lower-level results, the output of final results is just the same as in the centralized architecture, e.g., the results are sorted by key or selected by a range or threshold of values.

The above patterns have the following implications on design of a global-scale platform for scalable network traffic analytics. With user-defined map, reduce and output functions, it is possible to quickly implement a range of network traffic analytics in one centralized datacenter or a few datacenters as do current big data analytics in other domains. Further, it is possible to quickly reimplement such network traffic analytics on a network of network devices and deploy them onto such a data processing network. The raw data is processed near the data sources and only summaries of data are uploaded to upper-level DPUs. The implementation would be much more bandwidth-efficient with much faster response. Moreover, it is possible to automatically translate network traffic analytics following the above pattern from a centralized (or architecture-agnostic) architecture into a distributed architecture. In this way, the analytics could be executed on a range of architecture options automatically depending on factors such as data size, availability of resources, network link quality, costs, and requirements on latencies. Those options include adding arbitrary levels of DPUs, adjusting the number and positions of DPUs, changing the connections between DPUs.

Figure 12:
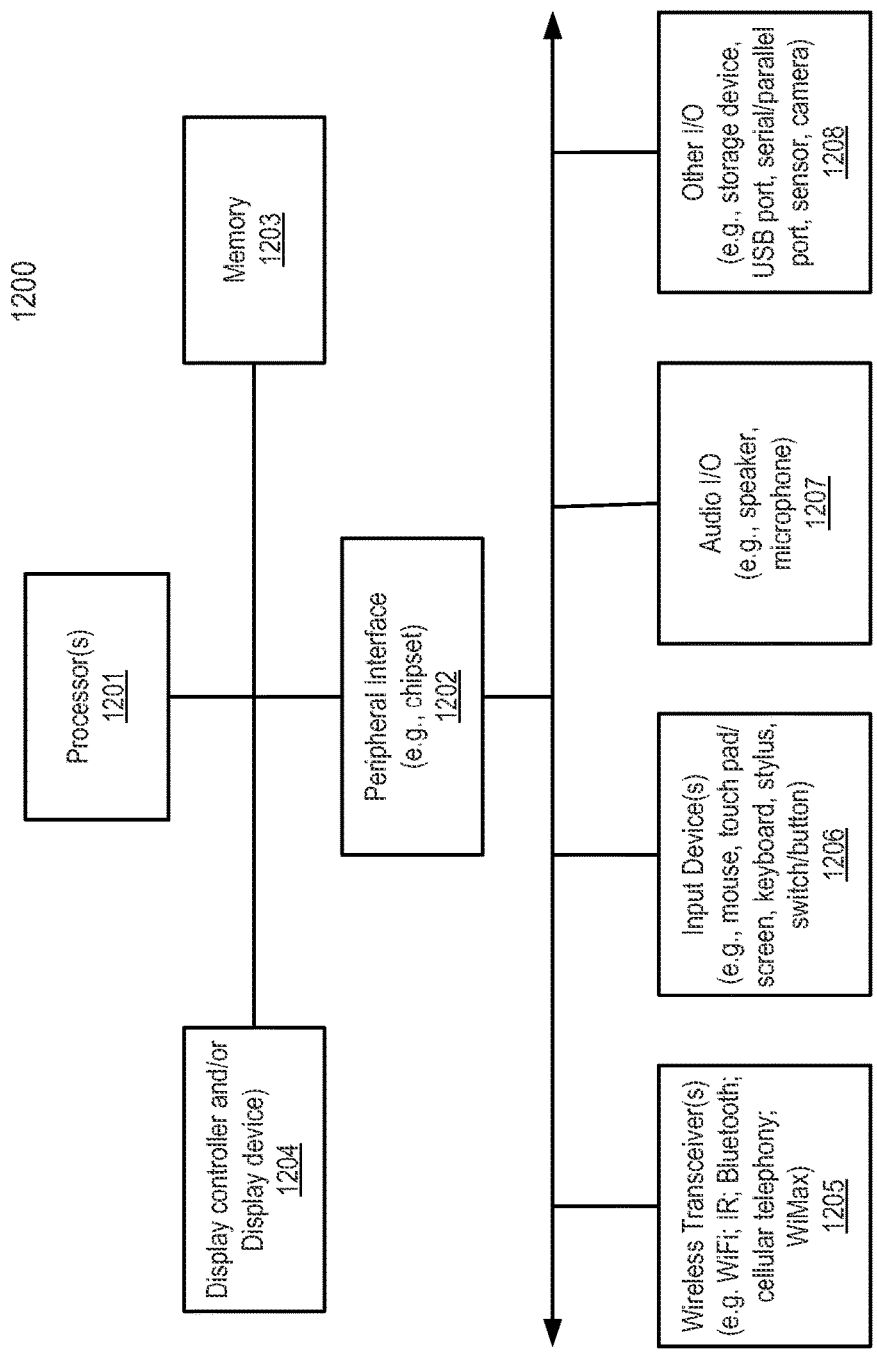
FIG. 12 is a block diagram illustrating an example of a data processing system that may be used with one embodiment of the invention.

FIG. 12 is a block diagram illustrating an example of a data processing system which may be used with one embodiment of the invention. For example, system 1200 may represent any of data processing systems described above performing any of the processes or methods described above. System 1200 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 12, in one embodiment, system 1200 includes processor 1201 and peripheral interface 1202, also referred to herein as a chipset, to couple various components to processor 1201 including memory 1203 and devices 1205-1208 via a bus or an interconnect. Processor 1201 may represent a single processor or multiple processors with a single processor core or multiple processor cores included therein. Processor 1201 may represent one or more general-purpose processors such as a microprocessor, a central processing unit (CPU), or the like. More particularly, processor 1201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1201 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1201 is configured to execute instructions for performing the operations and steps discussed herein.

Peripheral interface 1202 may include memory control hub (MCH) and input output control hub (ICH). Peripheral interface 1202 may include a memory controller (not shown) that communicates with a memory 1203. Peripheral interface 1202 may also include a graphics interface that communicates with graphics subsystem 1204, which may include a display controller and/or a display device. Peripheral interface 1202 may communicate with graphics device 1204 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 1201. In such a configuration, peripheral interface 1202 operates as an interface chip performing some functions of the MCH and ICH. Furthermore, a graphics accelerator may be integrated within the MCH or processor 1201.

Memory 1203 may include one or more volatile storage (or memory) devices such as random access memory (RAM), dynamic RAM (DRAM), synchronous DRAM (SDRAM), static RAM (SRAM), or other types of storage devices. Memory 1203 may store information including sequences of instructions that are executed by processor 1201, or any other device. For example, executable code and/or data of a variety of operating systems, device drivers, firmware (e.g., input output basic system or BIOS), and/or applications can be loaded in memory 1203 and executed by processor 1201. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 1202 may provide an interface to IO devices such as devices 120-1208, including wireless transceiver(s) 1205, input device(s) 1206, audio IO device(s) 1207, and other IO devices 1208. Wireless transceiver 1205 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 1206 may include a mouse, a touch pad, a touch sensitive screen (which may be integrated with display device 1204), a pointer device such as a stylus, and/or a keyboard (e.g., physical keyboard or a virtual keyboard displayed as part of a touch sensitive screen). For example, input device 1206 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 1207 may include a speaker and/or a microphone to facilitate voice-enabled functions, such as voice recognition, voice replication, digital recording, and/or telephony functions. Other optional devices 1208 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 1208 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 12 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method performed by a first network device in a network, the network comprising the first network device and a second network device, the first network device and the second network device communicatively coupled to a third network device, for aggregating Internet Protocol (IP) traffic in the network by utilizing a big data tool in a distributed manner, the method comprising:

receiving IP traffic from only a first portion of the network, wherein IP traffic from a second portion of the network is received by the second network device;

utilizing the big data tool and code operative to perform analytics to generate a summary of the IP traffic from the first portion of the network, in which a first snippet of the code is used to generate numerical values for the summary of the IP traffic from the first portion of the network, wherein a summary of the IP traffic from the second portion of the network is generated by the second network device utilizing its local big data tool and the code operative to perform analytics to generate the summary of the IP traffic from the second portion of the network, in which the first snippet of the code is used to generate numerical values for the summary of the IP traffic from the second portion of the network, wherein generating the summary of the IP traffic from the first portion of the network comprises:
  accessing a set of fields from IP data of the IP traffic of the first portion of the network,
  determining one or more key fields based on one or more fields from the set of fields,
  determining one or more value fields based on the one or more fields from the set of fields,
  partitioning the set of fields into groups based on the one or more key fields, wherein each group includes a unique key field and one or more value fields from the IP data having the same key field,
  counting a number of distinct value fields in the one or more value fields, and
  in response to counting the number of distinct value fields, determining a set of key fields from the unique key field of each group that receive-the IP traffic of the first portion of the network from more than a predetermined number of distinct value fields, and
  wherein the summary of the IP traffic of the second portion of the network is
  sent from the second network device to the third network device; and
sending the summary of the IP traffic of the first portion of the network to the third network device, causing the third network device to utilize its local big data tool and the code operative to perform analytics to generate a summary of the IP traffic of the first and second portions of the network based on the summary from the first network device and the summary from the second network device, by utilizing a second snippet of the code to perform calculations on the numerical values from the first and second portions of the network to generate resultant numerical values as the summary of the IP traffic of the first and second portions of the network, thereby allowing the code to be distributed among the first and second network devices at a lower level of a network hierarchy and to the third network device at a higher level of the network hierarchy to perform distributed calculations to generate the resultant numerical values.

2. The method of claim 1, wherein generating the summary of the IP traffic from the first portion of the network further comprises:
  for each group, aggregating the one or more value fields to generate an aggregate value, wherein the aggregate value indicates a number of unique values indicated by the one or more value fields for the unique key field.

3. The method of claim 1, wherein generating the summary of the IP traffic from the first portion of the network further comprises:
  for each group, aggregating the one or more value fields to generate an aggregate value, wherein the aggregate value indicates a sum of values indicated by the one or more value fields for the unique key field.

4. The method of claim 1, wherein generating the summary of the IP traffic from the first portion of the network further comprises:
  for each group, aggregating the one or more value fields to generate an aggregate value, wherein the aggregate value indicates a maximum value of values indicated by the one or more value fields for the unique key field.

5. The method of claim 1, wherein generating the summary of the IP traffic from the first portion of the network further comprises:
  for each group, aggregating the one or more value fields to generate an aggregate value, wherein the aggregate value indicates a minimum value of values indicated by the one or more value fields for the unique key field.

6. The method of claim 1, wherein generating the summary of the IP traffic from the first portion of the network further comprises:
  for each group, aggregating the one or more value fields to generate an aggregate value, wherein the aggregate value indicates an average value of values indicated by the one or more value fields for the unique key field.

7. The method of claim 1, wherein the first, second, and third network devices are geographically dispersed.

8. The method of claim 1, wherein the big data tool of the first, second, and third network device is one of: Hadoop and Spark.

9. The method of claim 1, wherein the first and second portions of the network to be processed by the first and second network devices, respectively, are determined based on a communication cost.

10. A method performed by a first network device in a network, the network comprising of the first network device communicatively coupled to a second network device and a third network device, for aggregating Internet Protocol (IP) traffic in the network by utilizing a big data tool in a distributed manner, the method comprising:
  receiving a summary of IP traffic of a first portion of the network from the second network device, wherein the summary of the IP traffic of the first portion of the network is generated by the second network device using its local big data tool and code operative to perform analytics, in which a first snippet of the code is used to generate numerical values for the summary of the IP traffic from the first portion of the network, wherein generating the summary of the IP traffic from the first portion of the network comprises:
    accessing a set of fields from IP data of the IP traffic of the first portion of the network,
    determining one or more key fields based on one or more fields from the set of fields,
    determining one or more value fields based on one or more fields from the set of fields,
    partitioning the set of fields into groups based on the one or more key fields, and wherein each group includes a unique key field and one or more value fields from the IP data having the same key field,
    counting a number of distinct value fields in the one or more value fields, and
    in response to counting the number of distinct value fields, determining a set of key fields from the unique key field of each group that receive the IP traffic of the first portion of the network from more than a predetermined number of distinct value fields;
  receiving a summary of IP traffic of a second portion of the network from the third network device, wherein the summary of the IP traffic of the second portion of the network is generated by the third network device using its local big data tool and the code operative to perform analytics to generate the summary of the IP traffic from the second portion of the network, in which the first snippet of the code is used to generate numerical values for the summary of the IP traffic from the second portion of the network;
  utilizing the big data tool and the code operative to perform analytics to generate a summary of the IP traffic of the first and second portions of the network based on the summary from the second network device and the summary from the third network device, by utilizing a second snippet of the code to perform calculations on the numerical values from the first and second portions of the network to generate resultant numerical values as the summary of the IP traffic of the first and second portions of the network, thereby allowing the code to be distributed among the second and third network devices at a lower level of a network hierarchy and to the first network device at a higher level of the network hierarchy to perform distributed calculations to generate the resultant numerical values; and providing the summary of the IP traffic of the first and second portions of the network as the resultant numerical values to a user, such that the user can determine whether an anomaly exists in the network.

11. The method of claim 10, wherein the big data tool at the first, second, and third network device is one of: Hadoop and Spark.

12. A first network device in a network, the network comprising the first network device and a second network device, the first network device and the second network device communicatively coupled to a third network device, for aggregating Internet Protocol (IP) traffic in the network by utilizing a big data tool in a distributed manner, the first network device comprising:

a network interface configured to exchange traffic over the network; and a data processing unit (DPU) module coupled to the network interface, and configured to:

receive IP traffic from only a first portion of the network, wherein IP traffic from a second portion of the network is received by the second network device, utilize the big data tool and code operative to perform analytics to generate a summary of the IP traffic from the first portion of the network, in which a first snippet of the code is used to generate numerical values for the summary of the IP traffic from the first portion of the network, wherein a summary of the IP traffic from the second portion of the network is generated by the second network device utilizing its local big data tool and the code operative to perform analytics to generate the summary of the IP traffic from the second portion of the network, in which the first snippet of the code is used to generate numerical values for the summary of the IP traffic from the second portion of the network, wherein generating the summary of the IP traffic from the first portion of the network comprises:

accessing a set of fields from IP data of the IP traffic of the first portion of the network, determining one or more key fields based on one or more fields from the set of fields, determining one or more value fields based on one or more fields from the set of fields, partitioning the set of fields into groups based on the one or more key fields, wherein each group includes a unique key field and one or more value fields from the IP data having the same key field, counting a number of distinct value fields in the one or more value fields, and in response to counting the number of distinct value fields, determining a set of key fields from the unique key field of each group that receive the IP traffic of the first portion of the network from more than a predetermined number of distinct value fields, and wherein the summary of the IP traffic of the second portion of the network is sent from the second network device to the third network device, and send the summary of the IP traffic of the first portion of the network to the third network device, causing the third network device to utilize its local big data tool and the code operative to perform analytics to generate a summary of the IP traffic of the first and second portions of the network based on the summary from the first network device and the summary from the second network device, by utilizing a second snippet of the code to perform calculations on the numerical values from the first and second portions of the network to generate resultant numerical values as the summary of the IP traffic of the first and second portions of the network, thereby allowing the code to be distributed among the first and second network devices at a lower level of a network hierarchy and to the third network device at a higher level of the network hierarchy to perform distributed calculations to generate the resultant numerical values.

13. The first network device of claim 12, wherein generating the summary of the IP traffic from the first portion of the network further comprises:

for each group, aggregating the one or more value fields to generate an aggregate value, wherein the aggregate value indicates a number of unique value indicated by the one or more value fields for the unique key field.

14. The first network device of claim 12, wherein generating the summary of the IP traffic from the first portion of the network further comprises:

for each group, aggregating the one or more value fields to generate an aggregate value, wherein the aggregate value indicates a sum of values indicated by the one or more value fields for the unique key field.

15. The first network device of claim 12, wherein generating the summary of the IP traffic from the first portion of the network further comprises:

for each group, aggregating the one or more value fields to generate an aggregate value, wherein the aggregate value indicates a maximum value of values indicated by the one or more value fields for the unique key field.

16. The first network device of claim 12, wherein generating the summary of the IP traffic from the first portion of the network further comprises:

for each group, aggregating the one or more value fields to generate an aggregate value, wherein the aggregate value indicates a minimum value of values indicated by the one or more value fields for the unique key field.

17. The first network device of claim 12, wherein generating the summary of the IP traffic from the first portion of the network further comprises:

for each group, aggregating the one or more value fields to generate an aggregate value, wherein the aggregate value indicates an average value of values indicated by the one or more value fields for the unique key field.

18. The first network device of claim 12, wherein the first, second, and third network devices are geographically dispersed.

19. The first network device of claim 12, wherein the big data tool of the first, second, and third network device is one of: Hadoop and Spark.

20. The first network device of claim 12, wherein the first and second portions of the network to be processed by the first and second network devices, respectively, are determined based on a communication cost.

21. A first network device in a network, the network comprising of the first network device communicatively coupled to a second network device and a third network device, for aggregating Internet Protocol (IP) traffic in the network by utilizing a big data tool in a distributed manner, the first network device comprising:
- a network interface configured to exchange traffic over the network; and
- a data processing unit (DPU) module coupled to the network interface, configured to:
  - receive a summary of IP traffic of a first portion of the network from the second network device, wherein the summary of IP traffic of the first portion of the network is generated by the second network device using its local big data tool and code operative to perform analytics, in which a first snippet of the code is used to generate numerical values for the summary of the IP traffic from the first portion of the network, wherein generating the summary of the IP traffic from the first portion of the network comprises:
    - accessing a set of fields from IP data of the IP traffic of the first portion of the network,
    - determining one or more key fields based on one or more fields from the set of fields,
    - determining one or more value fields based on one or more fields from the set of fields,
    - partitioning the set of fields into groups based on the one or more key fields, and wherein each group includes a unique key field and one or more value fields from the IP data having the same key field,
    - counting a number of distinct value fields in the one or more value fields, and
    - in response to counting the number of distinct value fields, determining a set of key fields from the unique key field of each group that receive the IP traffic of the first portion of the network from more than a predetermined number of distinct value fields,
  - receive a summary of IP traffic of a second portion of the network from the third network device, wherein the summary of the IP traffic of the second portion of the network is generated by the third network device using its local big data tool and the code operative to perform analytics to generate the summary of the IP traffic from the second portion of the network, in which the first snippet of the code is used to generate numerical values for the summary of the IP traffic from the second portion of the network,
  - utilize the big data tool and the code operative to perform analytics to generate a summary of the IP traffic of the first and second portions of the network based on the summary from the second network device and the summary from the third network device, by utilizing a second snippet of the code to perform calculations on the numerical values from the first and second portions of the network to generate resultant numerical values as the summary of the IP traffic of the first and second portions of the network, thereby allowing the code to be distributed among the second and third network devices at a lower level of a network hierarchy and to the first network device at a higher level of the network hierarchy to perform distributed calculations to generate the resultant values, and
  - provide the summary of the IP traffic of the first and second portions of the network as the resultant numerical values to a user, such that the user can determine whether an anomaly exists in the network.

22. The first network device of claim 21, wherein the big data tool at the first, second, and third network device is one of: Hadoop and Spark.

* * * * *